(12) United States Patent
Bohms

(10) Patent No.: US 9,652,476 B2
(45) Date of Patent: May 16, 2017

(54) SYSTEM AND METHODS FOR PRODUCING AND RETRIEVING VIDEO WITH STORY-BASED CONTENT

(76) Inventor: Eric Vila Bohms, London (GB)

(*) Notice: Subject to any disclaimer, the term of this patent is extended or adjusted under 35 U.S.C. 154(b) by 905 days.

(21) Appl. No.: 12/559,625

(22) Filed: Sep. 15, 2009

(65) Prior Publication Data

US 2010/0017718 A1    Jan. 21, 2010

Related U.S. Application Data

(63) Continuation-in-part of application No. 12/151,325, filed on May 6, 2008, now abandoned.

(51) Int. Cl.
| | |
|---|---|
| *G06F 3/048* | (2013.01) |
| *G06F 17/30* | (2006.01) |
| *G11B 27/034* | (2006.01) |
| *G11B 27/10* | (2006.01) |
| *G11B 27/34* | (2006.01) |

(52) U.S. Cl.
CPC .. *G06F 17/30265* (2013.01); *G06F 17/30781* (2013.01); *G11B 27/034* (2013.01); *G11B 27/105* (2013.01); *G11B 27/34* (2013.01)

(58) Field of Classification Search
USPC .......................................... 707/999; 715/719
See application file for complete search history.

(56) References Cited

U.S. PATENT DOCUMENTS

| | | | |
|---|---|---|---|
| 6,725,259 B1 * | 4/2004 | Bharat | 709/219 |
| 6,795,808 B1 | 9/2004 | Strubbe et al. | |
| 7,337,172 B2 | 2/2008 | Shapiro | |
| 2006/0031245 A1 | 2/2006 | Krieglstein | |
| 2007/0203911 A1 | 8/2007 | Chiu | |
| 2007/0250479 A1 | 10/2007 | Lunt et al. | |

(Continued)

FOREIGN PATENT DOCUMENTS

| | | |
|---|---|---|
| EP | 1074924 | 2/2001 |
| WO | 2007125474 | 11/2007 |

OTHER PUBLICATIONS

Sequoia Media Group, LC, Product Solutions, available at: http://www.sequoiamg.com/products.html (viewed on Mar. 27, 2008).

(Continued)

*Primary Examiner* — Jeffrey A Gaffin
*Assistant Examiner* — Mohamed Abou El Seoud
(74) *Attorney, Agent, or Firm* — Law Office of Steven R. Olsen, PLLC; Steven R. Olsen

(57) ABSTRACT

Embodiments of the invention provide a system and methods for producing and retrieving video with story-based content. Embodiments of the invention use an interview process to capture a contributor's knowledge in the form of a narrative or story. An enabling feature of such embodiments is that one or more predetermined questions are associated with each predetermined story topic. Embodiments of the invention also provide a mechanism for appending a story with insight from one or more other vantage points (personal perspectives) as part of the knowledge capture process. In embodiments of the invention, the story/question relationship may be used to classify KM records. Metadata associated with the story and/or the contributor may also be used for the automatic classification and retrieval of such records.

3 Claims, 21 Drawing Sheets

(56) References Cited

U.S. PATENT DOCUMENTS

2007/0250496 A1 10/2007 Halliday et al.
2007/0250791 A1 10/2007 Halliday et al.
2007/0261071 A1 11/2007 Lunt et al.
2009/0282338 A1 11/2009 Bohms

OTHER PUBLICATIONS

Our Story, Home, available at: http://www.ourstory.com/ (viewed on Mar. 27, 2008).
Flypaper, Persuade, Educate and Entertain, available at: http://www.flypaper.net/(viewed on Mar. 27, 2008).
Cross S E et al, "A Digital Video Library Application in Health Care" IEEE International Joint Symposia on Intellegence and Systems, Rockville, MD, US, Nov. 4, 1996, pp. 254-260 (see abstract; p. 255, right-hand column, last line—p. 256).

* cited by examiner

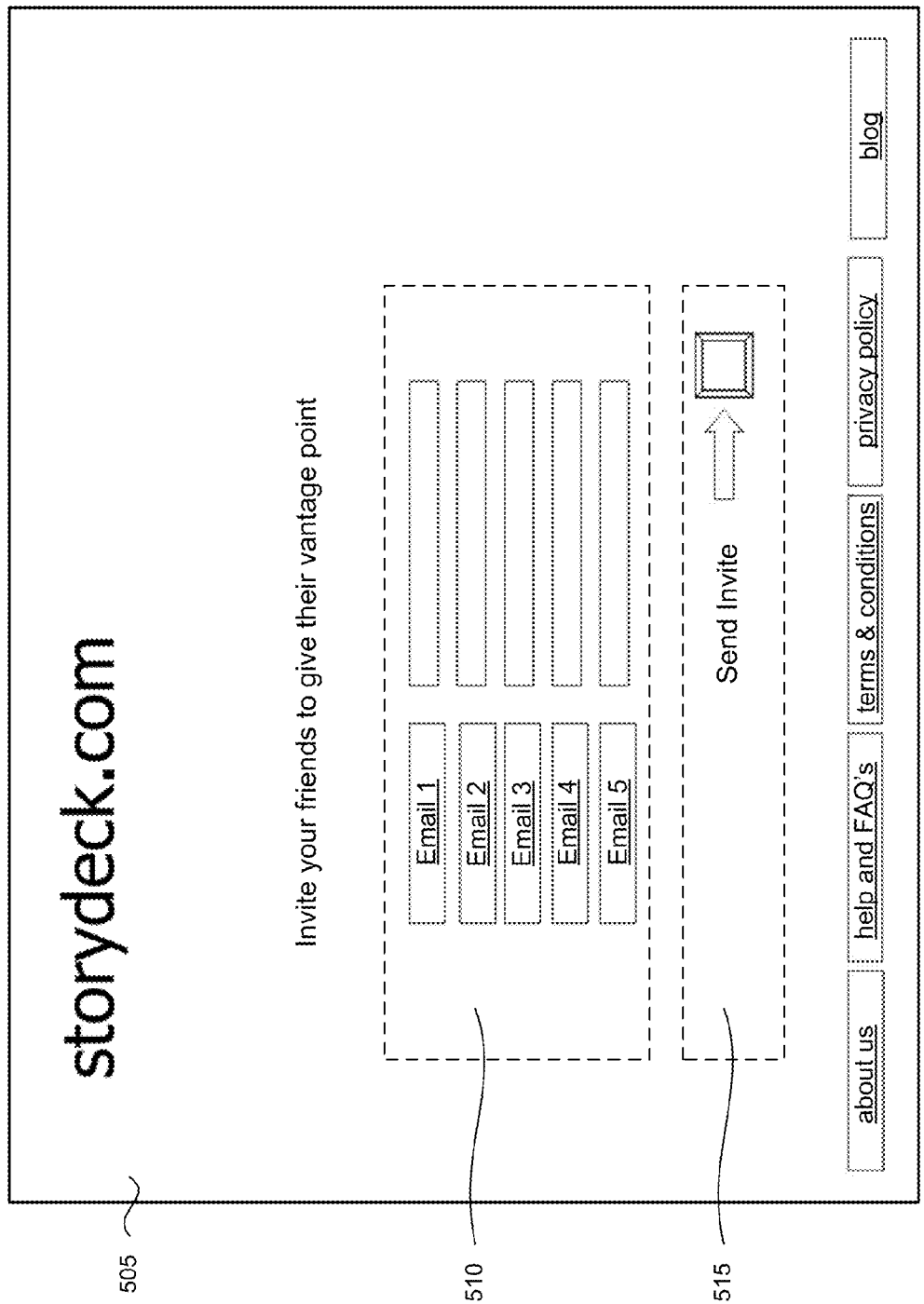

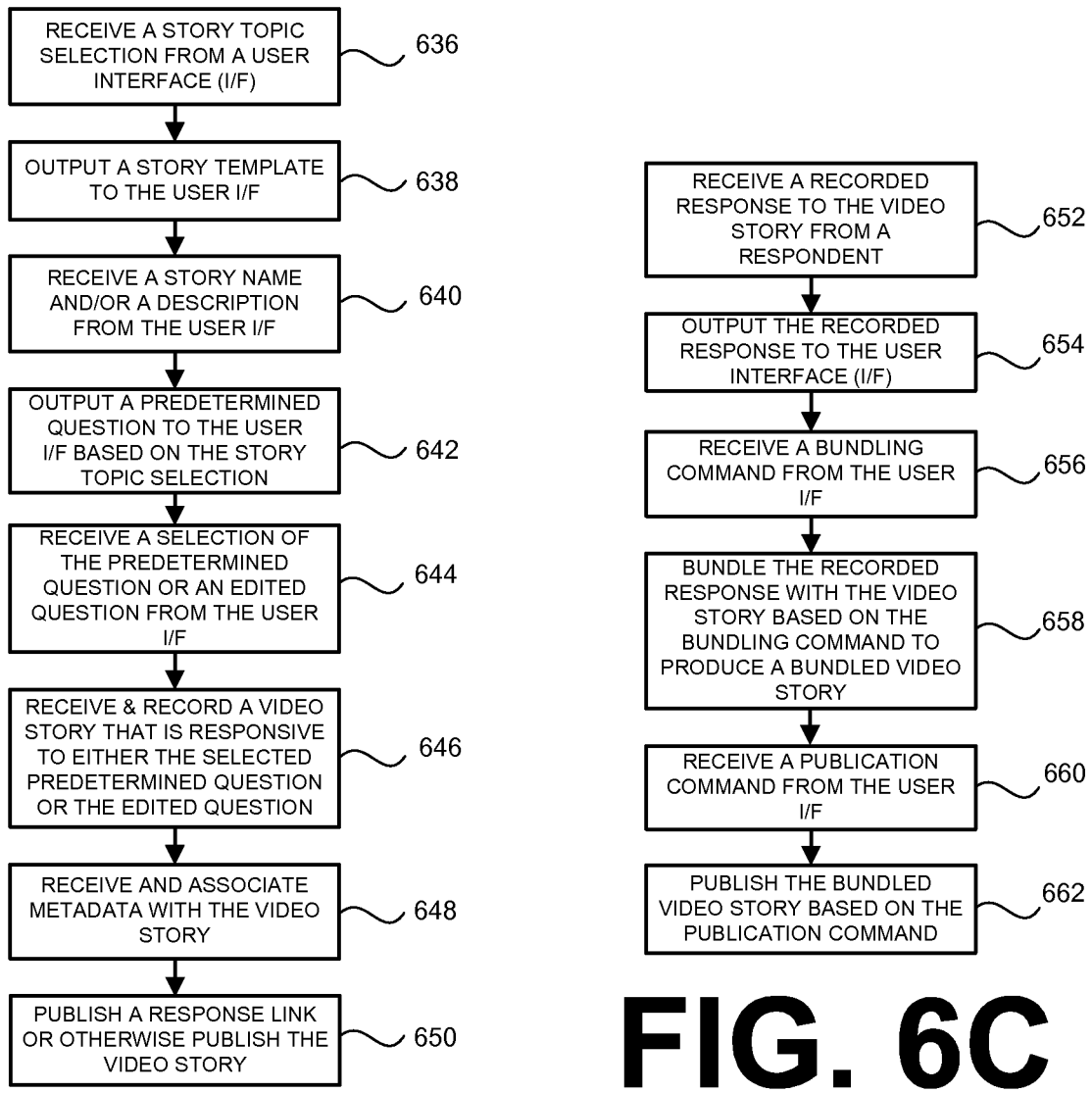

FIG. 9

FIG. 11 storydeck.com
your knowledge in motion ™ select a vantage point contributor and specify build criteria

- Originator ✓     Present most recent first ✓
- Michele Smith ✓     Include data ☐
- Ronnie Ray ✓     Include name ☐
- Joan Lovell ✓

Search on key word or phrase within story ☐

Enter key words or phrase [ ]

next ⇧ ☐

Log in ID [ ]
Password [ ]

| about us | help and FAQ's | terms & conditions | privacy policy | blog |

1105
1110

SYSTEM AND METHODS FOR PRODUCING AND RETRIEVING VIDEO WITH STORY-BASED CONTENT

CROSS-REFERENCE TO RELATED APPLICATIONS

This application is a continuation-in-part (CIP) of prior U.S. application Ser. No. 12/151,325, filed on May 6, 2008 now abandoned.

BACKGROUND

1. Field of the Invention

The invention relates generally to video production and/or the selective retrieval of video, and more particularly, but without limitation, to a system and methods for producing and retrieving video with story-based content.

2. Description of the Related Art

The field of knowledge management (KM) relates generally to the capture, storage, and retrieval of knowledge. Typically, KM is an effort to share such knowledge within an organization to improve overall operational performance. KM can also be used to share historical knowledge more broadly, or to facilitate a collaborative development environment (i.e., to expand knowledge).

Various KM systems and methods are known. For example, knowledge databases, libraries, or other repositories have been established so that articles, user manuals, books, or other records can be classified and stored. The records can then be selectively retrieved based on the classification.

Known KM schemes have many disadvantages, however. For instance, the capture (or creation) of knowledge may be performed on an ad hoc basis, rather than in response to known organizational needs. Furthermore, the capture process may not effectively extract the tacit (subconscious or internalized) knowledge of the domain expert or other contributor. For these and other reasons, the amount, percentage, or degree of useful records in the KM repository may be lacking.

In addition, known processes for classifying records often rely on manual intervention to assign subject-based classifications. Such manual intervention may delay knowledge sharing and/or increase the costs associated with a KM initiative. Another disadvantage is that retrieval processes that rely on subject-based classifications in response to search queries may be ineffective due to an inherent lack of context. Moreover, it may be difficult for a user to efficiently identify and review the relevant portion(s) of records that are responsive to a search query of the KM repository. For at least the foregoing reasons, improved systems and methods are needed to support the capture and retrieval processes associated with a KM process.

SUMMARY OF THE INVENTION

Embodiments of the invention seek to overcome one or more of the shortcomings described above. Embodiments of the invention use an interview process to capture a contributor's knowledge in the form of a video-based narrative or story. An enabling feature of such embodiments is that one or more predetermined questions are associated with each predetermined story topic are presented to a storyteller during production of the video. Embodiments of the invention also provide a mechanism for appending a video story with insight from one or more other vantage points (personal perspectives) as part of the knowledge capture process.

In embodiments of the invention, the story/question relationship may be used to classify KM records. Metadata associated with the story and/or the contributor may also be used for the automatic classification and retrieval of such records. Moreover, in embodiments of the invention, the retrieval process includes a method for sequencing a stream of responsive video records for presentation to a knowledge recipient.

An embodiment of the invention provides a processor-readable medium. The processor-readable medium can store processor-executable application code. The processor-executable application code can include instructions to perform a method. The method may include: receiving a story topic selection from a user interface (I/F); outputting a predetermined question to the user I/F based on the story topic selection; receiving a question selection from the user I/F, the question selection indicating one of the predetermined question and a user-supplied question; and receiving a video story from the user I/F, the video story associated with the question selection.

BRIEF DESCRIPTION OF THE DRAWINGS

The present invention will be more fully understood from the detailed description below and the accompanying drawings, wherein:

FIG. 5 is an illustration of a graphical user interface, according to an embodiment of the invention;

FIG. 6B is a flow diagram of a video-based story capture process, according to an embodiment of the invention;

FIG. 6C is a flow diagram of a video-based story capture process, according to an embodiment of the invention;

FIG. 9 is an illustration of a graphical user interface screen, according to an embodiment of the invention;

FIG. 11 is an illustration of a graphical user interface, according to an embodiment of the invention;

DETAILED DESCRIPTION

Figures 1A, 1B:
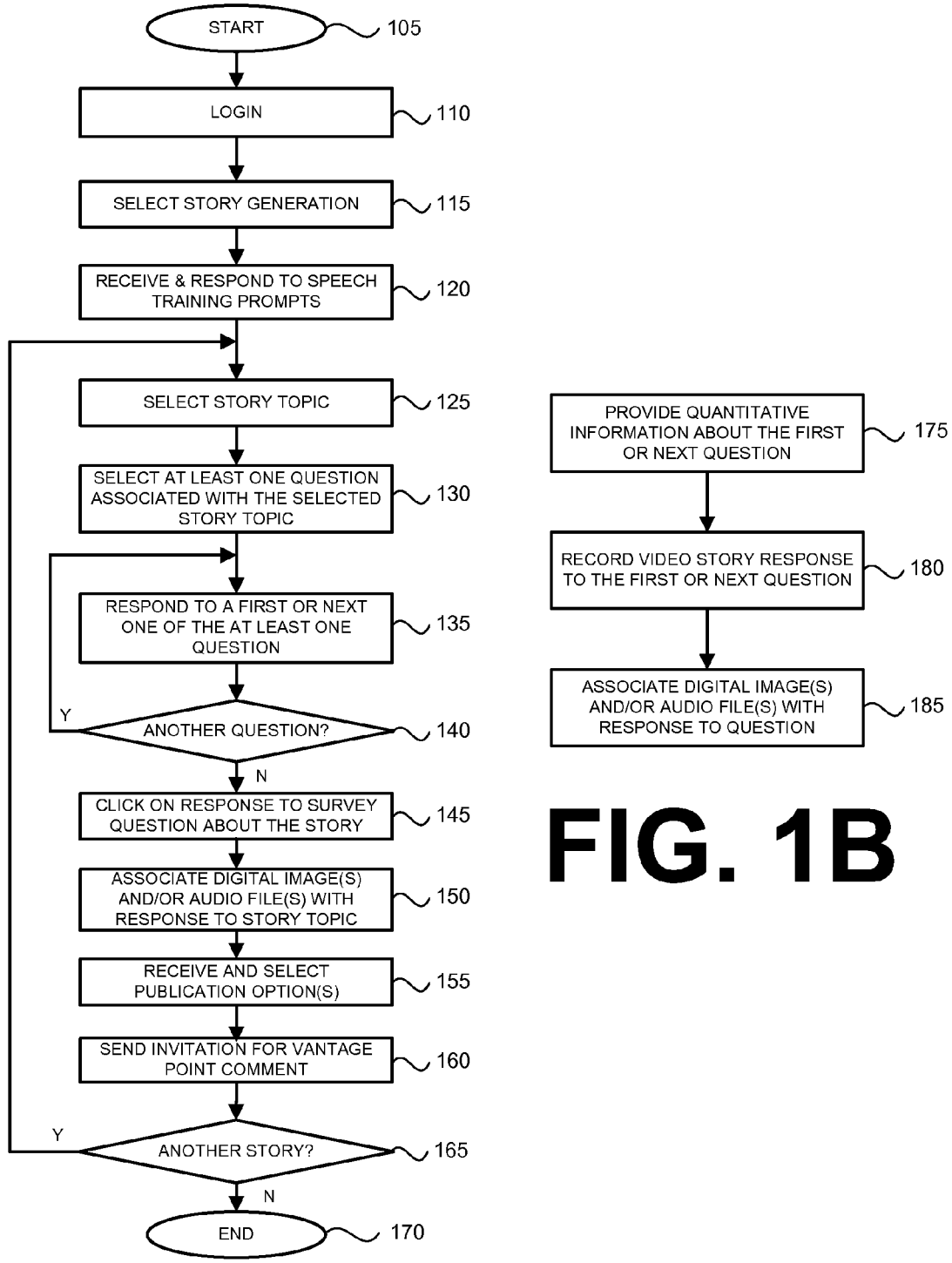
FIG. 1A is a flow diagram of a video-based story capture process, according to an embodiment of the invention.
FIG. 1B is a flow diagram of a video-based story capture process, according to an embodiment of the invention.

Embodiments of the invention will now be described more fully with reference to FIGS. 1 through 17, in which embodiments of the invention are shown. This invention may, however, be embodied in many different forms and should not be construed as limited to the embodiments set forth herein. In the drawings, reference designators may be duplicated for the same or similar features.

Story Capture Process

One necessary feature of KM is capturing or otherwise creating knowledge from domain experts or other sources.

Historically, storytelling has been used to entertain and/or to distribute knowledge. Unfortunately, storytelling, whether in writing or in person, is typically in the form of a narrative (e.g., a description of a series of events). Moreover, the narrative is not always fully captured by the recipient for later recall and use. In embodiments of the invention, a storyteller selects a story topic, and then is presented with one or more predetermined questions that are associated with the selected story topic. The storyteller's responses may therefore be a personal experience narrative that is somewhat directed by the question(s) presented. In addition, in embodiments of the invention the storyteller's responses may be video recorded for later use. Embodiments of the invention also capture alternative vantage points on the story in video format. In embodiments of the invention quantitative information from a storyteller and/or vantage point contributor may also be captured to supplement the video story.

Such a capture process has many benefits. For instance, the predetermined questions may be crafted to satisfy organizational objectives. One such objective may be, for instance, to capture knowledge that will be strategically useful to the organization. Another objective might be to encourage the storyteller to reveal tacit knowledge, or even knowledge that might be perceived as unfavorable to the storyteller. Where they exist, the alternative vantage points associated with a video story may provide a richer transfer of knowledge concerning the same events. Story capture processes are described in more detail with reference to FIGS. 1-7 below.

FIG. 1A is a flow diagram of a video-based story capture process, according to an embodiment of the invention. As shown therein, the process begins in step 105. A user logs into a system in step 110, which may include, for example, entering a login identifier (ID) and password. The user then selects a story generation function in step 115. Step 115 may be distinguished, for instance from the selection of a story retrieval function. In step 120, a user receives and responds to speech training prompts. Such training may later be useful for extracting keywords or other information from the story content. In step 125, a user selects a story topic, for instance from a menu of possible story topics. The user then selects at least one question that is associated with the selected story topic in step 130. Next, in step 135, the user responds to a first or next question. An embodiment of step 135 is also described below with reference to FIG. 1B. Then, in conditional step 140, a user determines whether to answer another question. Where the result of conditional step 140 is in the affirmative, the user may return to step 135. Otherwise, the user may click on a response to a question about the selected story topic in step 145.

For example, in step 145, a user could receive a question such as "Do you consider yourself an expert in this subject area?" or "May interested parties contact you directly to discuss your video story?" and the user could respond to such questions by clicking on a "yes" button or a "no" button on a graphical user interface (GUI). Other types of quantitative information could also be collected from the user in step 145 to supplement the user's recorded video story.

The user may receive and select publication options for the story in step 155. As used herein, publication refers to posting a video story on a website (e.g., You Tube, My Space, or other personal blog), sending the video story or a link to the video story to one or more email addressees, saving the video to a local or remote data store, and/or posting a link to a video-based story on one or more Web pages. A user may send one or more invitations for vantage point comments in step 160. Vantage point comments refer to video comments and/or quantitative information provided by other actors in the user's video story. In conditional step 165, a user considers whether to record another video story. Where the user decides to do so, the process returns to step 125; otherwise the process terminates in step 170.

Variations to the process illustrated in FIG. 1A are possible. For example, step 115 may be implicit, where other options do not exist. In addition, in alternative embodiments, steps 120, 140, 145, 150, 155, 160 and/or 165 may be omitted, according to design choice.

In embodiments of the invention, step 125 could include adding a story name and/or story description. In embodiments of the invention, step 130 may include editing the selected question or entering a different question to be answered.

The process illustrated in FIG. 1A could also be modified by adding a receiving step (not shown) subsequent to step 160. The receiving step could include receiving comments, e.g., from vantage point invitees. In addition, the receiving step could be followed by an editing/publication step (also not shown). The editing/publication step could include, for instance, selecting one or more vantage point comments, bundling the selected vantage point comments with the original video-based story to produce a bundled story, and publishing the bundled story.

FIG. 1B is a flow diagram of a video-based story capture process, according to an embodiment of the invention. FIG. 1B is a more detailed embodiment of step 135 discussed above. As illustrated in FIG. 1B, the process begins by providing quantitative information about the first or next question. Such quantitative information could be provided, for instance, in response to a "yes" or "no" question. Such information could also be provided on a Likert or other psychometric response scale. Preferably, step 175 includes clicking on a button, box, or other GUI feature that facilitates its collection. An example of such a GUI feature is described below with reference to FIG. 4.

In step 180, the user records a video story response to the first or next question. In embodiments of the invention, step 180 includes using a camera, microphone, and media application to produce a video recording. Then, in step 185, the user may associate one or more digital images and/or audio files with the user's question response. Step 185 could include, for instance, uploading a digital photograph that is related to the user's response to the first or next question.

Response step 135 need not include each of steps 175, 180, and 185. For instance, step 135 could include any one or more of steps 175, 180, and 185 in any sequence.

Figure 2:
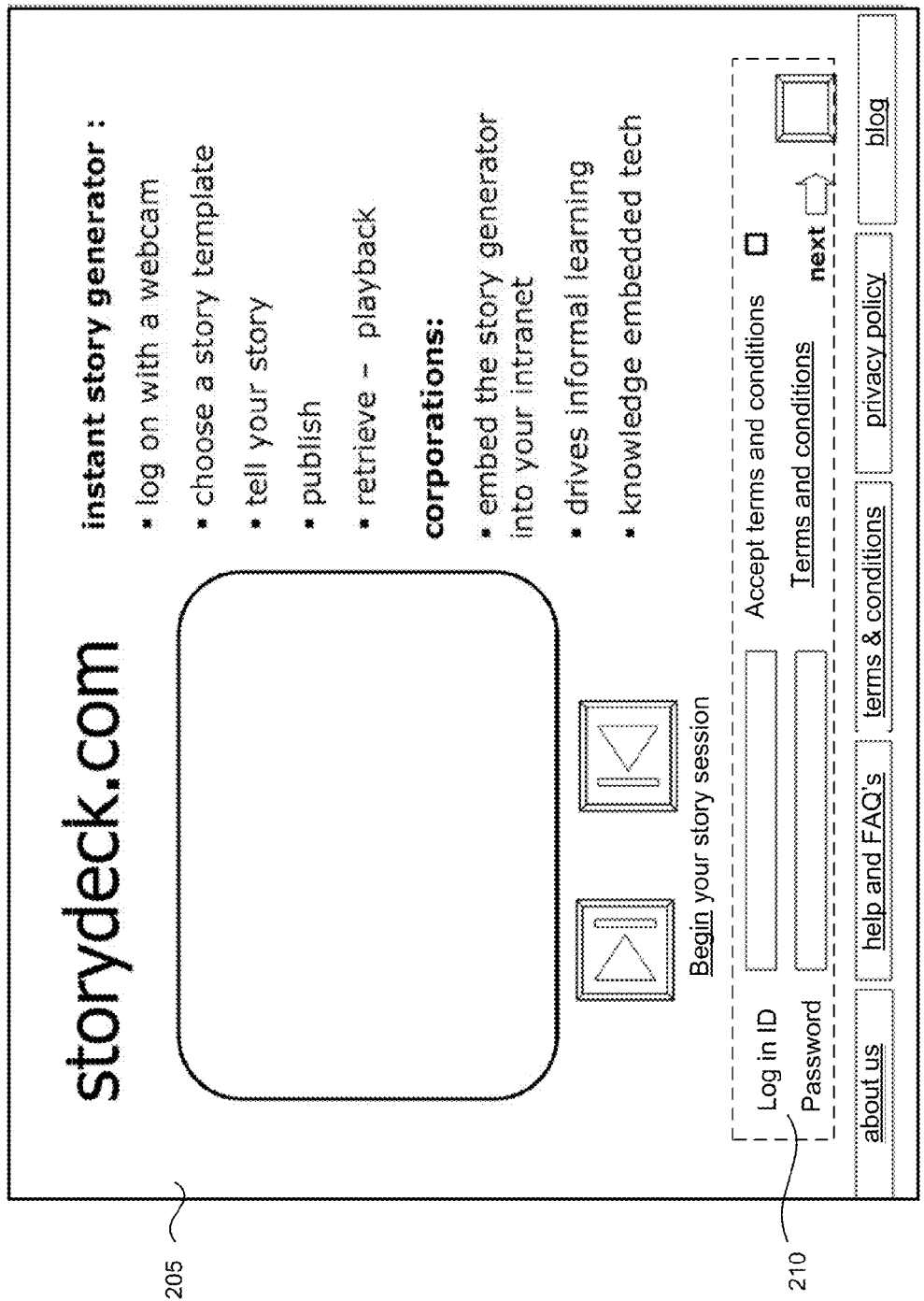
FIG. 2 is an illustration of a graphical user interface, according to an embodiment of the invention.

FIG. 2 is an illustration of a graphical user interface (GUI), according to an embodiment of the invention. As illustrated in FIG. 2, a GUI 205 includes a login portion 210. The login portion 210 may include, for example, data fields for login ID, password, and/or an acknowledgement of terms and conditions. The GUI 205 may be used in the execution of login step 110.

Figure 3:
FIG. 3 is an illustration a graphical user interface, according to an embodiment of the invention.

FIG. 3 is an illustration a graphical user interface, according to an embodiment of the invention. As shown therein, a GUI 305 includes a story selection portion 310 and a media portion 315. In embodiments of the invention, the story selection portion 310 may be used, for example, for a user to execute step 115. The media portion 315 may be used by a user to upload, for example, photos and/or audio files associated with the selected story as discussed above with reference to step 185.

Figure 4:
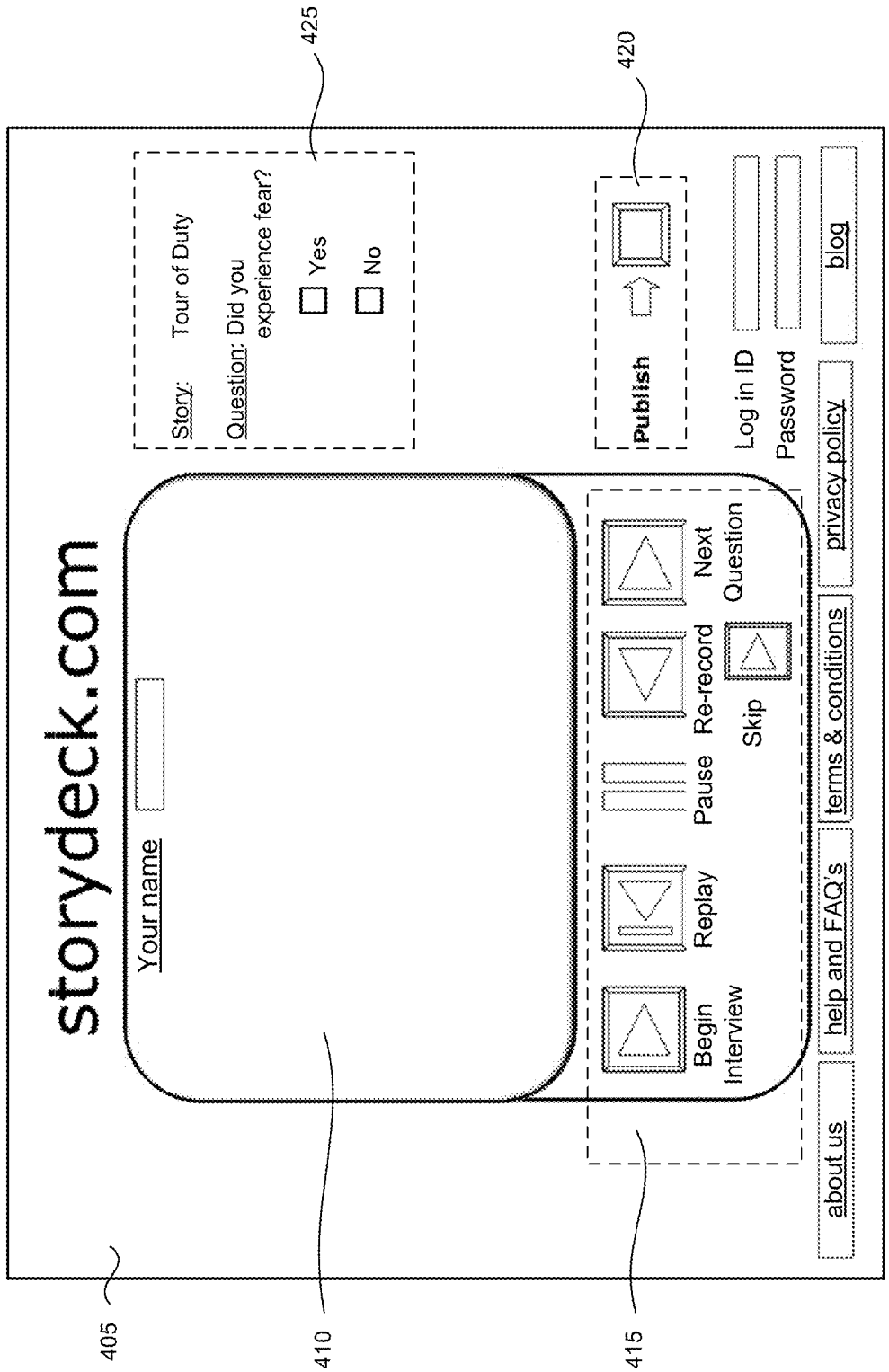
FIG. 4 is an illustration of a graphical user interface, according to an embodiment of the invention.

FIG. 4 is an illustration of a graphical user interface, according to an embodiment of the invention. As shown therein, a GUI 405 includes a video display portion 410, a control portion 415, a publication portion 420, and a quantitative information input portion 425. A user may use the GUI 405 in responding to a first or next question in step 135. For example, a user may record, play, pause, or perform other viewing and/or editing functions using the control portion 415. A user may view portions of the video in the video display portion 410. Before, during, or after recording a response to the first or next question, the user may provide quantitative information using the quantitative information input portion 425. Upon completion of the recording, a user may publish the recorded video story using the publication portion 420, in accordance with publication step 155.

FIG. 5 is an illustration of a graphical user interface, according to an embodiment of the invention. As shown therein, a GUI 505 includes an electronic mail (email) listing portion 510 and an invitation button 515. During the execution of invitation step 160, a user may enter one or more email addresses into the email listing portion 510 and select the invitation button 515 to invite comment from friends, colleagues, or other persons having a vantage point associated with the primary contributor's recorded video story.

The processes illustrated in FIGS. 6A, 6B, 6C and 7 are presented from the perspective of a process embodied in a KM system.

Figure 6A:
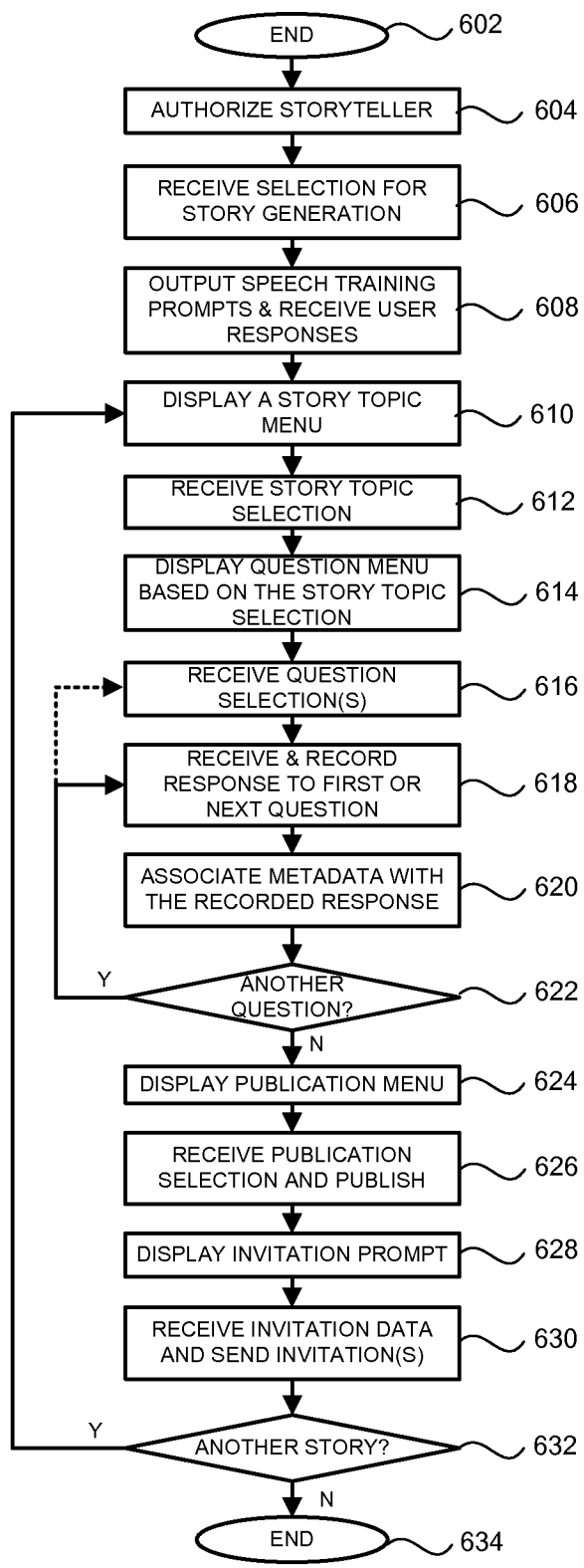
FIG. 6A is a flow diagram of a video-based story capture process, according to an embodiment of the invention.

FIG. 6A is a flow diagram of a video-based story capture process, according to an embodiment of the invention. After beginning in step 602, the process authorizes a storyteller in step 604. Authorization step 604 may include, for instance, presenting GUI 205 to the storyteller, receiving information that the storyteller enters into the login portion 210, and verifying the login ID and password based on stored user account data. Then, in step 606, the process may receive the storyteller's selection for story generation. The process outputs speech training prompts to the storyteller and receives responses to the speech training prompts in step 608. Such speech training prompts may require the storyteller, for instance, to speak one or more predetermined words into a microphone. The process may display a story topic menu to the storyteller, for example using GUI 305, in step 610 and receive a story topic selection from the storyteller in step 612. In step 614, the process displays a predetermined question menu based on the storyteller's story topic selection. In step 616, the process receives one or more question selections from the user. Then, in step 618, the process receives and records a video response to a first or next question, for instance using GUI 405. Optionally, step 618 could include receiving quantitative information from the storyteller using a GUI feature such as the quantitative information input portion 425 illustrated in FIG. 4. Step 618 may also include receiving or otherwise associating digital images, audio files, or other non-video content with the user's story. In step 620, the process associates metadata with the recorded response. An embodiment of step 620 is described in more detail below with reference to FIG. 7.

In conditional step 622, the process determines whether to present the storyteller with another question associated with the selected story topic. The operation of step 622 could be controlled by the system or could be based on the storyteller's input. Where the result of conditional step 622 is answered in the affirmative, the process returns to step 616 (in the case where the process had only received a single question selection) or to step 618 (in the case where the process had received multiple question selections). Otherwise, the process advances to step 624 to display a publication menu to the storyteller. In step 626, the process receives the storyteller's publication selection and publishes the recorded story based on the publication selection. The process displays a vantage point invitation prompt in step 628 and then receives invitation data and executes vantage point invitations in step 630. Step 628 may include, for example, presenting GUI 505 to the storyteller. The invitation data could be or include, for instance, one or more email addresses. In conditional step 632, a storyteller is presented with the option of recording another video story. Where the storyteller wishes to do so, the process returns to step 610; otherwise, the process terminates in step 634.

Variations to the process illustrated in FIG. 6A are possible. For example, step 606 may be implicit, where other options do not exist. In addition, in alternative embodiments, steps 608, 620, 622, 624, 626, 628, 630 and/or 632 may be omitted, according to design choice.

FIG. 6B is a flow diagram of a video-based story capture process, according to an embodiment of the invention. The process in FIG. 6B is an alternative to the process illustrated in FIG. 6A. The process in FIG. 6B receives a story topic selection from a user interface (I/F) in step 636 and outputs a story template to the user I/F in step 638. Then, in step 640, the process receives a story name and/or description from the user I/F. The process outputs one or more predetermined questions to the user I/F in step 642. A user might then select one of the predetermined questions to answer in the form of a video recording. Alternatively, a user might edit one of the predetermined questions and then answer the edited question. Accordingly, the process may receive a selection of a predetermined question or an edited question from the user I/F in step 644. The process then receives and records a response to either the selected predetermined question or the edited question, as applicable, in step 646. In step 648, the process receives and associates metadata with the recorded response. As an example, any portion or all of the process described above with reference to FIG. 7 could be used in executing step 648. In step 650, the process publishes a response link for the purpose of receiving comments related to the recorded response, or otherwise publishes the video story. A response link could be, for instance, an html link. Publishing the response link could include, for example, including the link in one or more pieces of email correspondence (e.g., in an email broadcast) and/or posting the response link on a Web site. A response link may enable feedback from a broader community or the public at large; this is in contrast to a vantage point invitation that more narrowly solicits feedback from a restricted predetermined list of potential respondents. The response link in step 650 may be or include, for instance, an html link.

Variations to the process illustrated in FIG. 6B are possible. For instance, in an alternative embodiment, steps 638 and 642 could be combined; in this instance, steps 640 and 644 may also be combined. Any of the process step discussed above with reference to FIG. 6A could be used to modify the process illustrated in FIG. 6B. For example, step 650 could be supplemented or replaced with displaying an invitation prompt, receiving invitation data, and sending vantage point invitations, as described above with reference to steps 628 and 630.

FIG. 6C is a flow diagram of a video-based story capture process, according to an embodiment of the invention. The process in FIG. 6C might be performed, for instance, subsequent to the process illustrated in FIG. 6A or 6B.

The process illustrated in FIG. 6C begins in step 652 by receiving a response from a respondent. The response that is received in step 652 could be, for example, a response to an invitation (as in the case of a vantage point invitee). Alternatively, the response received in step 652 could be from a member a broader community (e.g., from a non-invitee who discovered an associated response link). In embodiments of the invention, the process described below with reference to FIG. 15 could be used to execute step 652.

In step 654, the process may output the response to the user interface (I/F). The process receives a bundling command from the user I/F in step 656. In step 658, the process bundles the response with the video story based on the bundling command to produce a bundled video story. Accordingly, a bundled story may be a group that includes an original video story and at least one associated response. As described above, the associated response could be or include a response from a vantage point invitee and/or a response from an uninvited member of a larger community. The process receives a publication command from the user I/F in step 660 and publishes the bundled video story based on the publication command in step 662. The publication in step 662 could include, for instance, posting a video story on a website (e.g., You Tube, My Space, or other personal blog), sending the video story to one or more email addressees, and/or saving the video to a local or remote data store.

Figure 6D:
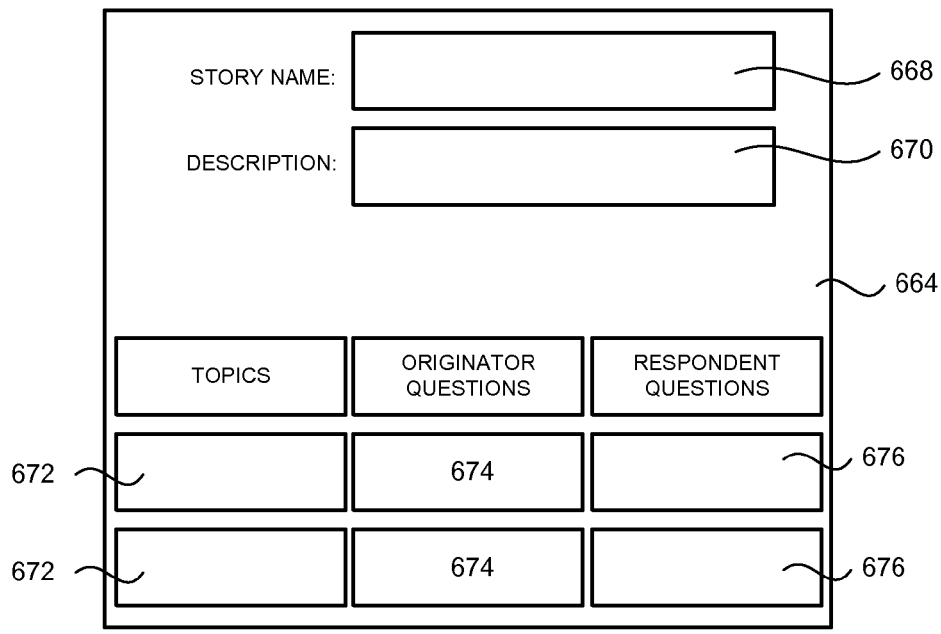
FIG. 6D is an illustration of a graphical user interface, according to an embodiment of the invention.

FIG. 6D is an illustration of a graphical user interface (GUI), according to an embodiment of the invention. FIG. 6D illustrates that a GUI 664 may include fields 668 and 670 that may be used to receive a story name and description, respectively. Fields 668 and 670 may be used, for instance to enable step 640 described above. GUI 664 may further include topic fields 672, originator question fields 674, and respondent questions 676. In the illustrated embodiment, each topic defines an associated originator question/respondent question pair. Accordingly, data in fields 672, 674, and/or 676 may be output to the GUI 664 in step 642. Selections and/or edited data may also be received via fields 672, 674, and/or 676 in the execution of step 644. For instance, a user may select a single topic (row) from multiple displayed topics (rows) in executing step 644 using the GUI 664.

Figure 6E:
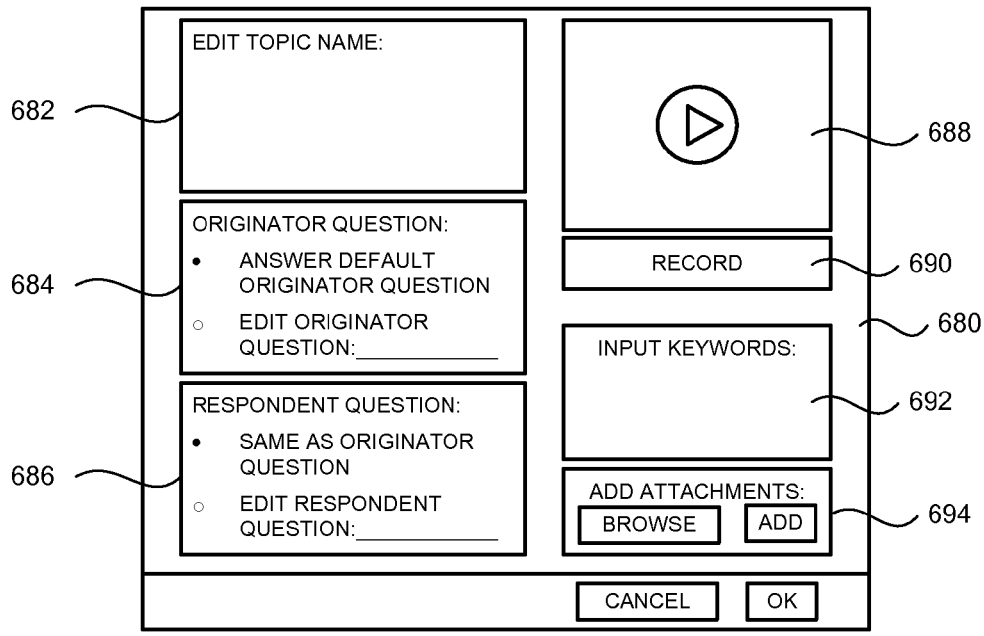
FIG. 6E is an illustration of a graphical user interface, according to an embodiment of the invention.

FIG. 6E is an illustration of a graphical user interface (GUI), according to an embodiment of the invention. FIG. 6E illustrates that a GUI 680 may include a topic field 682, an originator question window 684, a respondent question window 686, a video display window 688, a video control button 690, a keyword window 692, and attachment buttons 694. The GUI 680 might be displayed, for example, in response to a topic selection that a user makes using GUI 664. The originator question window 684 and/or the respondent question window 686 may be used to receive selections and/or edited questions in step 644. The video display window 688 and/or the video control button 690 may be used to record the response in step 646. The keyword window 692 may be used to receive metadata in step 648.

Figure 7:
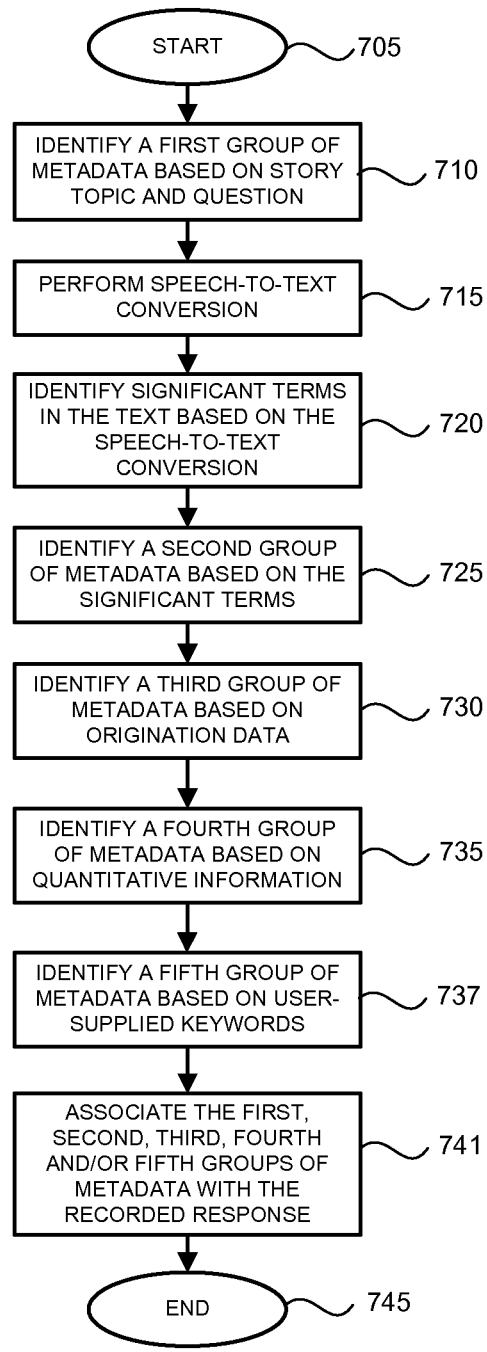
FIG. 7 is a flow diagram of a process for associating metadata with a video story, according to an embodiment of the invention.

FIG. 7 is a flow diagram of a process for associating metadata with a video story, according to an embodiment of the invention. The process illustrated in FIG. 7 is a more detailed illustration for an embodiment of process step 620 or 648. As shown in FIG. 7, the process begins in step 705, and then identifies a first group of metadata in step 710 based on the story topic and the selected question.

In step 715, the process performs speech-to-text conversion based on an audio portion of the recorded video. In step 720, the process identifies significant terms in the text based on the speech-to-text conversion. Step 720 may be, for example, rule-based and/or index-based. A rule-based identification could be or include, for instance, determining the frequency of each word used in the video. Index-based identification could be or include comparing each word used in the video to a predetermined index of significant terms. In step 725, the process identifies a second group of metadata based on the significant terms that were identified in step 720.

In step 730, the process may identify a third group of metadata based on origination data. Origination data may be, for example, based on user account data such as a user's sex or age. Moreover, origination data may include, for instance, the date or time that a story was recorded, or the date or time that events described in the story took place.

In step 735, the process identifies a fourth group of metadata based on quantitative information. Such quantitative information may be based, for instance, on the storyteller's interaction with the quantitative information input portion 425 of GUI 405 in the execution of step 618.

In step 737, the process identifies a fifth group of metadata based on user-supplied keywords. For instance, the process could receive keywords supplied by a user via keyword window 692.

In step 741, the process associates the first, second, third, fourth, and/or fifth groups of metadata with the recorded video story. The process terminates in step 745. From the description of step 741 it should be clear that steps 710, 715, 720, 725, 730, 735 and/or 737 are optional.

An uninvited respondent and/or a knowledge consumer may use a story retrieval process to locate one or more relevant video stories.

In embodiments of the invention, metadata that is associated with a recorded video story in step 620 or 648 may be used in a story retrieval process.

Story Retrieval Process

Figure 8:
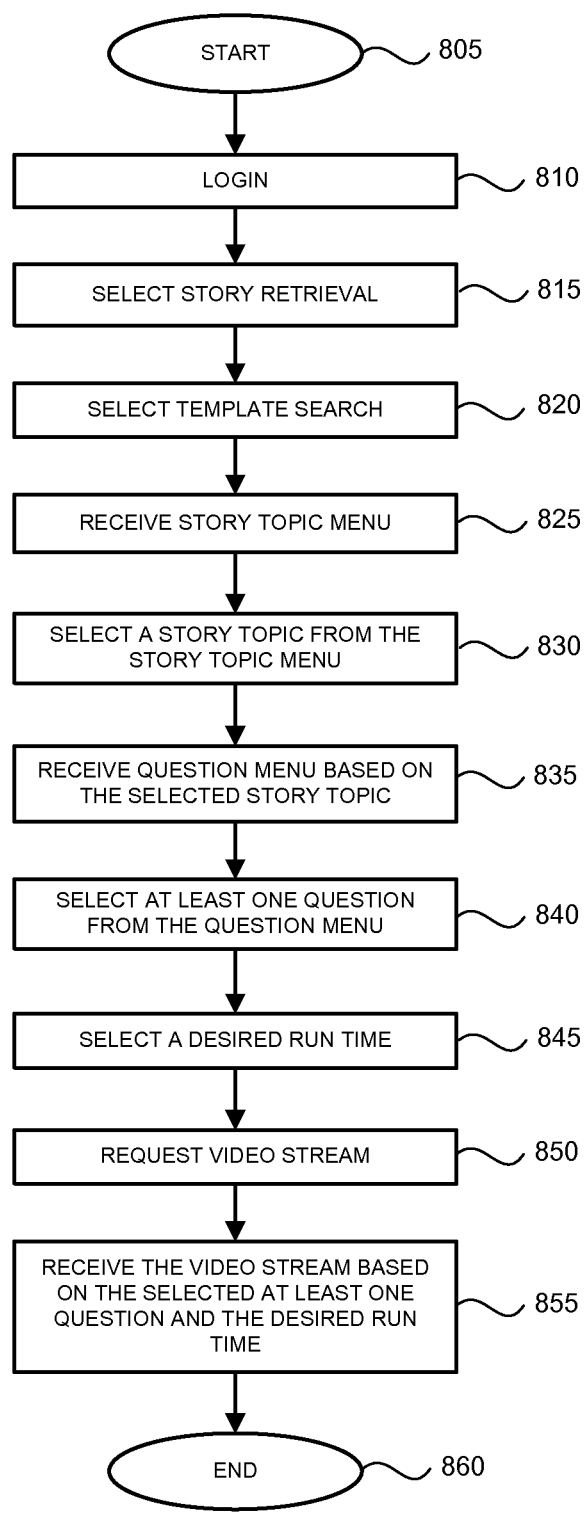
FIG. 8 is a flow diagram of a story retrieval process, according to an embodiment of the invention.

FIG. 8 is a flow diagram of a story retrieval process, according to an embodiment of the invention. As illustrated therein, the process begins in step 805 and a user may login in step 810. In step 815, a user selects a story retrieval function. A user may then select a template search in step 820 and receive a story topic menu in step 825 based on the selected template search. As used herein, a template refers to a predetermined association between each story topic and one or more questions relating to the story topic. Accordingly, a user selects a story topic from the story topic menu in step 830 and then receives a question menu based on the selected story topic in step 835. In step 840, a user selects at least one question from the question menu. A user then selects a desired run time in step 845 and requests a responsive video stream in step 850.

In step 855, a user receives a video stream based on the selected at least one question and the desired run time. The video stream received in step 855 may be or include, for instance, video clips associated with each of multiple storytellers in response to the selected story topic and question(s). Step 855 may also include viewing quantitative information received from storytellers and/or vantage point contributors. Step 855 may also include scoring by the user of the retrieval process; for instance a viewer may score one or more retrieved videos based on the utility of such video(s) to the viewer. The process terminates in step 860.

Variations to the process illustrated in FIG. 8 are possible. For instance, step 815 may be implicit where other options do not exist. In addition, step 845 may be omitted, according to design choice. Moreover, step 855 may include receiving one or more video files rather than a video stream.

Figs. 9-11, 12A and 12B are graphical user interfaces (GUI's) that may be used in executing story retrieval processes.

Figure 9:
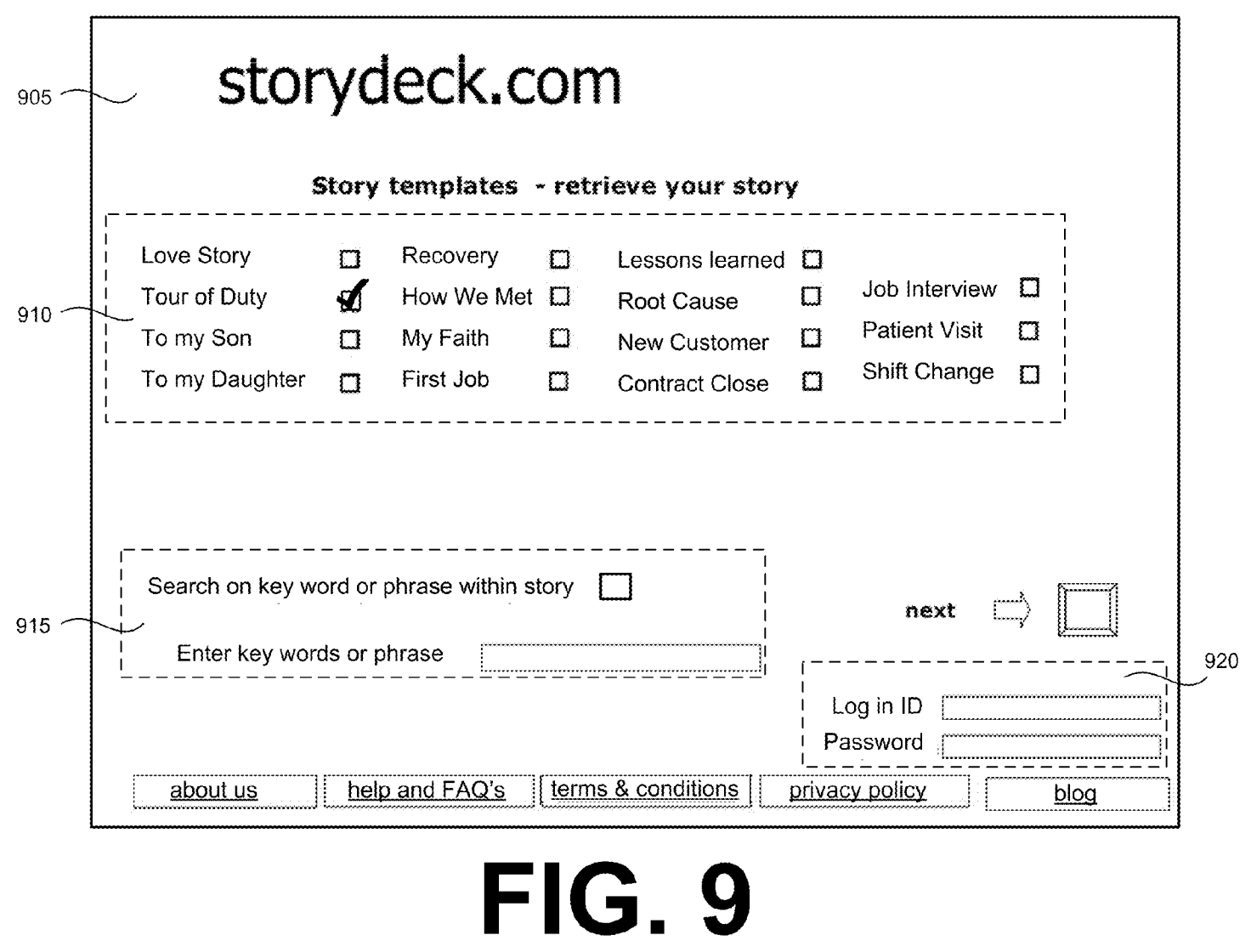

FIG. 9 is an illustration of a graphical user interface, according to an embodiment of the invention. As shown therein, a GUI 905 includes a story menu 910, a keyword portion 915, and a login portion 920. GUI 905 may be used, for example, during steps 810 and 830 described above with reference to FIG. 8.

Figure 10:
FIG. 10 is an illustration of a graphical user interface, according to an embodiment of the invention.

FIG. 10 is an illustration of a graphical user interface, according to an embodiment of the invention. As shown therein, a GUI 1005 includes a question portion 1010, a perspective portion 1015, and a duration portion 1020. The GUI 1005 may be used, for example, in selecting at least one question from the question menu as described above with reference to step 840. In particular, the question portion 1010 illustrates that a user may select one or more questions during the retrieval process. In the embodiments illustrated in FIGS. 9 and 10, the questions listed in question portion 1010 are associated with the "Tour of Duty" user selection in story menu 910. A different story topic selection would result in a different set of questions. The perspective portion 1015 illustrates that a knowledge consumer may request video in step 850 from the story of an originator (or originators) and/or one or more invited vantage point contributors. The duration portion 1020 may be used in executing step 845.

FIG. 11 is an illustration of a graphical user interface, according to an embodiment of the invention. As shown therein, a GUI 1105 may include a vantage point menu 1110. The vantage point menu 1110 may be used, for example, to further refine a request for video in step 850.

Figure 12A:
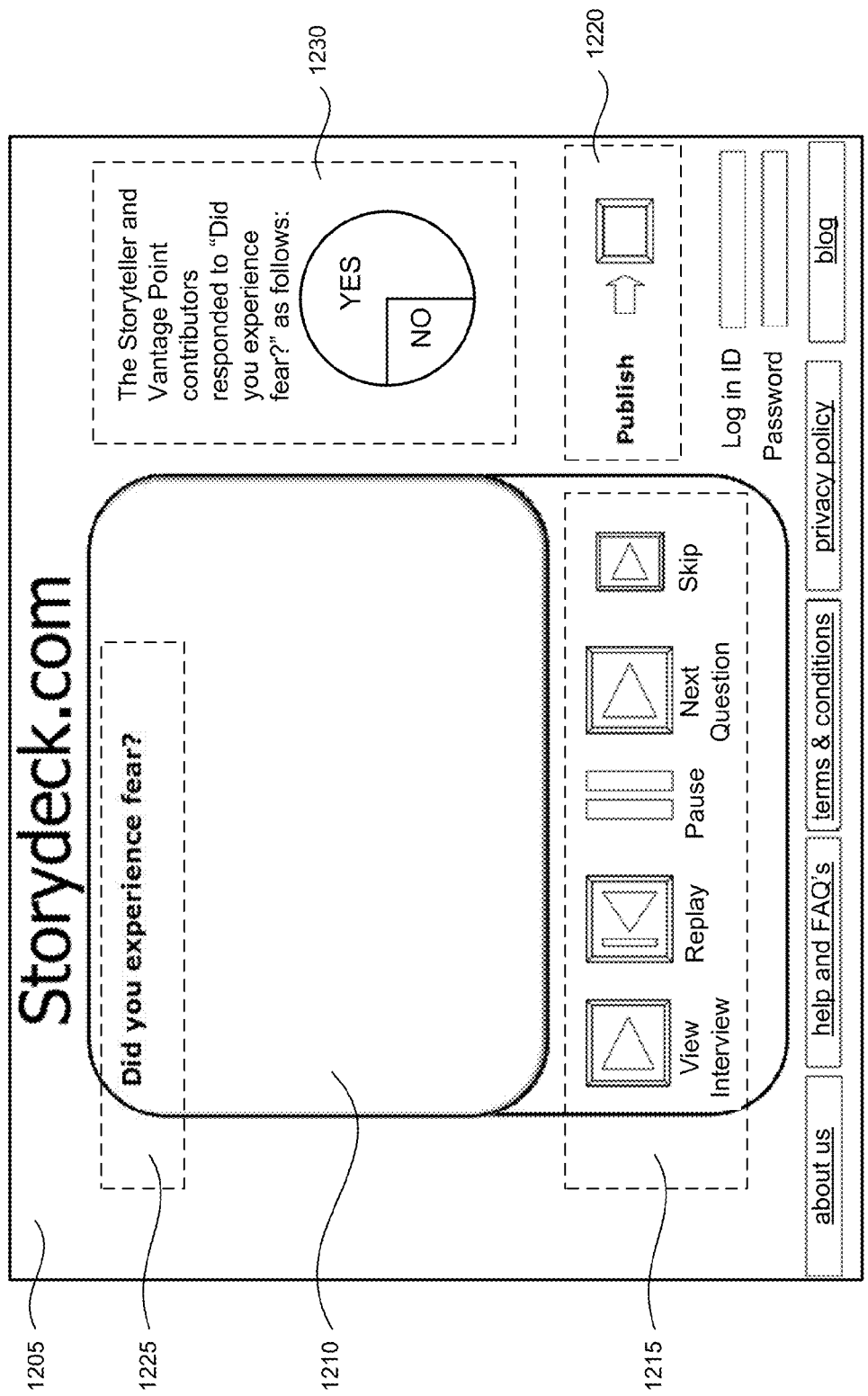
FIG. 12A is an illustration of a graphical user interface, according to an embodiment of the invention.

FIG. 12A is an illustration of a graphical user interface, according to an embodiment of the invention. As shown therein, a GUI 1205 includes a video display portion 1210, control buttons 1215, a publication button 1220, and a quantitative information display portion 1230. The video display portion 1210 may further include a question overlay portion 1225.

During execution of step 855, a user may view a stream of video in the video display portion 1210 and control such stream using the control buttons 1215. Preferably, during review of the video stream, a user may see text associated with the video stream in the question overlay portion 1225. For example, as illustrated in FIGS. 10 and 12, where a user has selected the question "did you experience fear?" in question portion 1010, a user may observe that same question displayed in the question overlay portion 1225 during receipt of the responsive video stream. Publication button 1220 allows a user to publish the retrieved video stream. The quantitative information display portion 1230 allows a user of the retrieval process to view quantitative information that has been previously collected from an originator (storyteller) and/or vantage point contributors.

Figure 12B:
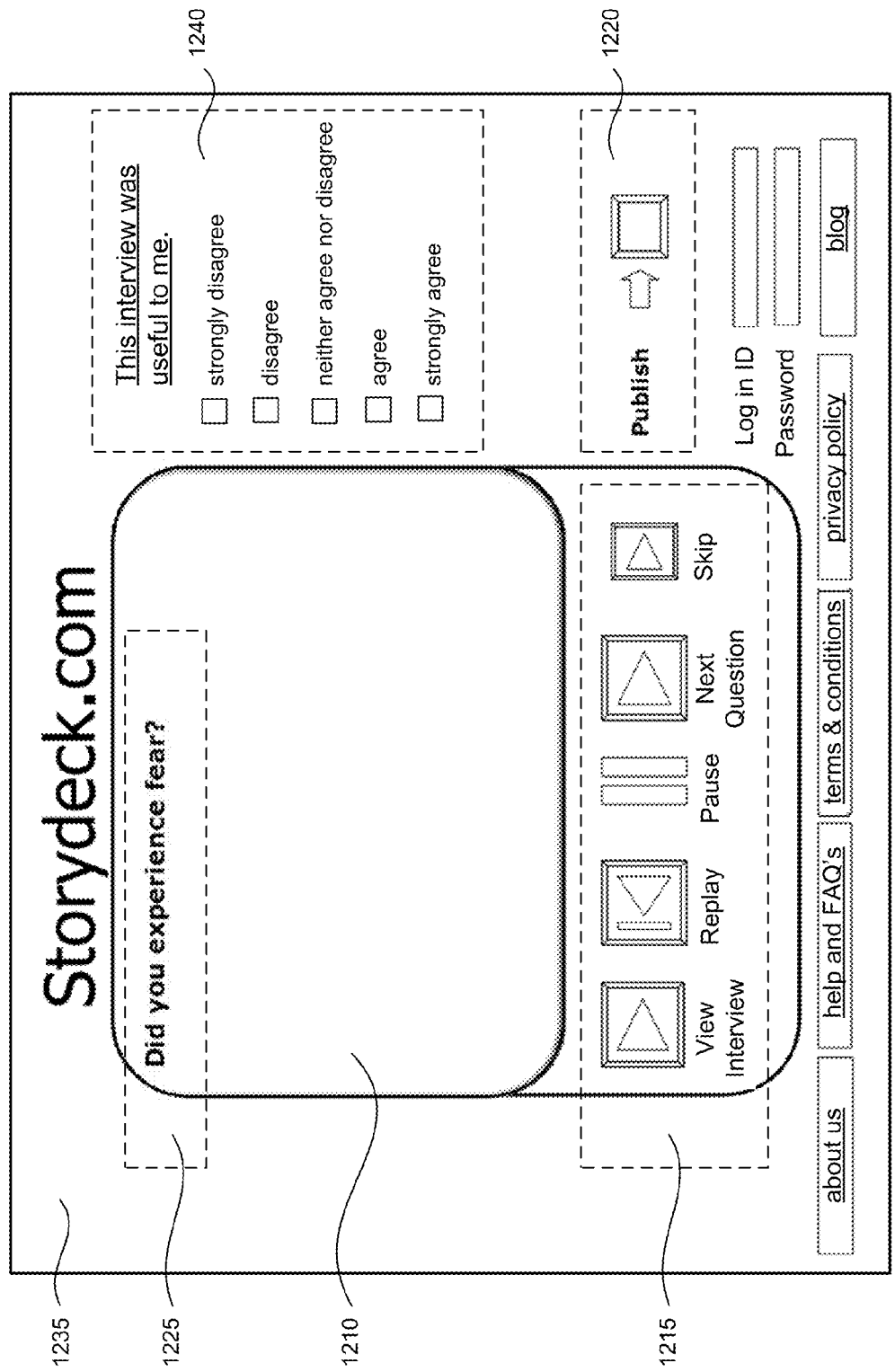
FIG. 12B is an illustration of a graphical user interface, according to an embodiment of the invention.

FIG. 12B is an illustration of a graphical user interface (GUI) 1235, according to an embodiment of the invention. GUI 1235 is identical to GUI 1205, except that GUI 1235 includes a scoring portion 1240 rather than a quantitative information display portion 1230. The scoring portion 1240 is configured to solicit and collect feedback from a user of the retrieval process. In the illustrated embodiment, such feedback is related to the utility of the retrieved video story(ies). In an embodiment of the invention, a user may individually score each of multiple videos included in a retrieved video stream using the scoring portion 1240. Alternative embodiments of the invention could combine the features of GUIs 1205 and 1235, according to design choice.

Figure 13:
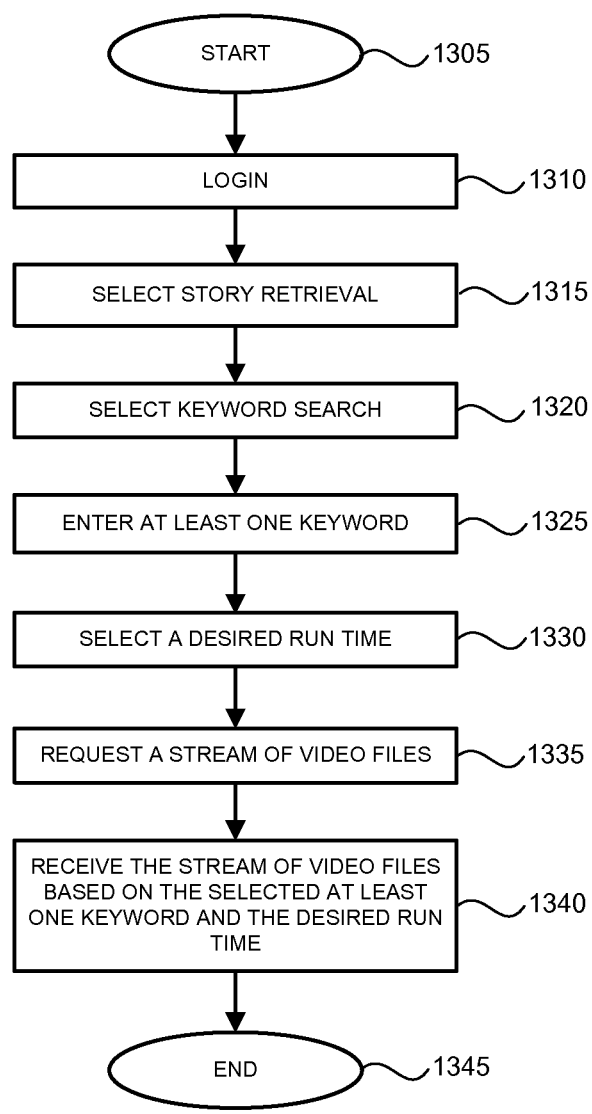
FIG. 13 is a flow diagram of a story retrieval process, according to an embodiment of the invention.

FIG. 13 is a flow diagram of a story retrieval process, according to an embodiment of the invention. The process begins in step 1305, and a user may login to a KM system in step 1310. In step 1315, a user selects a story retrieval process. Next, a user may select a keyword search function in step 1320 and enter at least one keyword in step 1325. In step 1330, a user selects a desired run time. A user may then request a responsive video stream in step 1335. Step 1335 could include specifying whether the knowledge recipient wishes to receive only responsive video stories from primary contributors (originators), or whether the knowledge recipient would like to also receive video clips from vantage point contributors instead of, or in addition to, those of the primary contributors. Where step 1335 includes a request for responsive video clips from vantage point contributors, step 1335 may include a menu for the selection of one or more vantage point contributors. A user receives the video stream based on the selected at least one keyword and the desired run time in step 1340, and the process terminates in step 1345. Step 1340 may include viewing quantitative information received from storytellers and/or vantage point contributors. Step 1340 may also include scoring by the user of the retrieval process; for instance a viewer may score one or more retrieved videos based on the perceived utility of such video(s) to the viewer.

A user may use GUI 905 while performing portions of the process illustrated in FIG. 13. For example, a user may use the login portion 920 to execute step 1310, and a user may use the keyword portion 915 to execute steps 1320 and/or 1325. Furthermore, a user may use GUIs 1205 and/or 1235 to perform step 1340.

Variations to the process illustrated in FIG. 13 are possible. For instance, steps 1310 and 1330 may be omitted, according to design choice. In addition, step 1315 may be omitted where the story retrieval function is inherent. Moreover, step 1340 could include receiving one or more video files instead of a video stream.

Figure 14A:
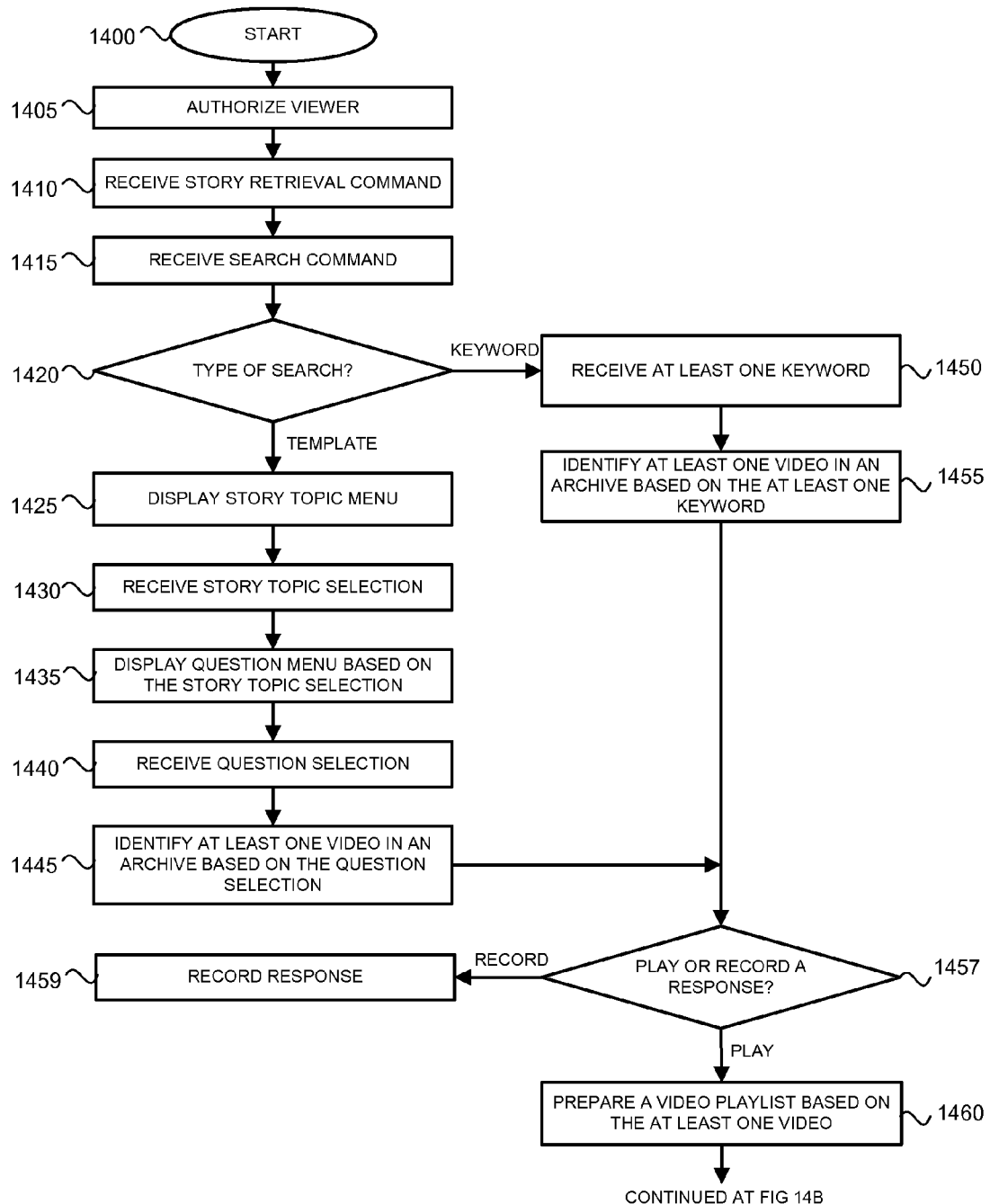
FIGS. 14A and 14B are a flow diagram of a story retrieval process, according to an embodiment of the invention.
Figure 14B:
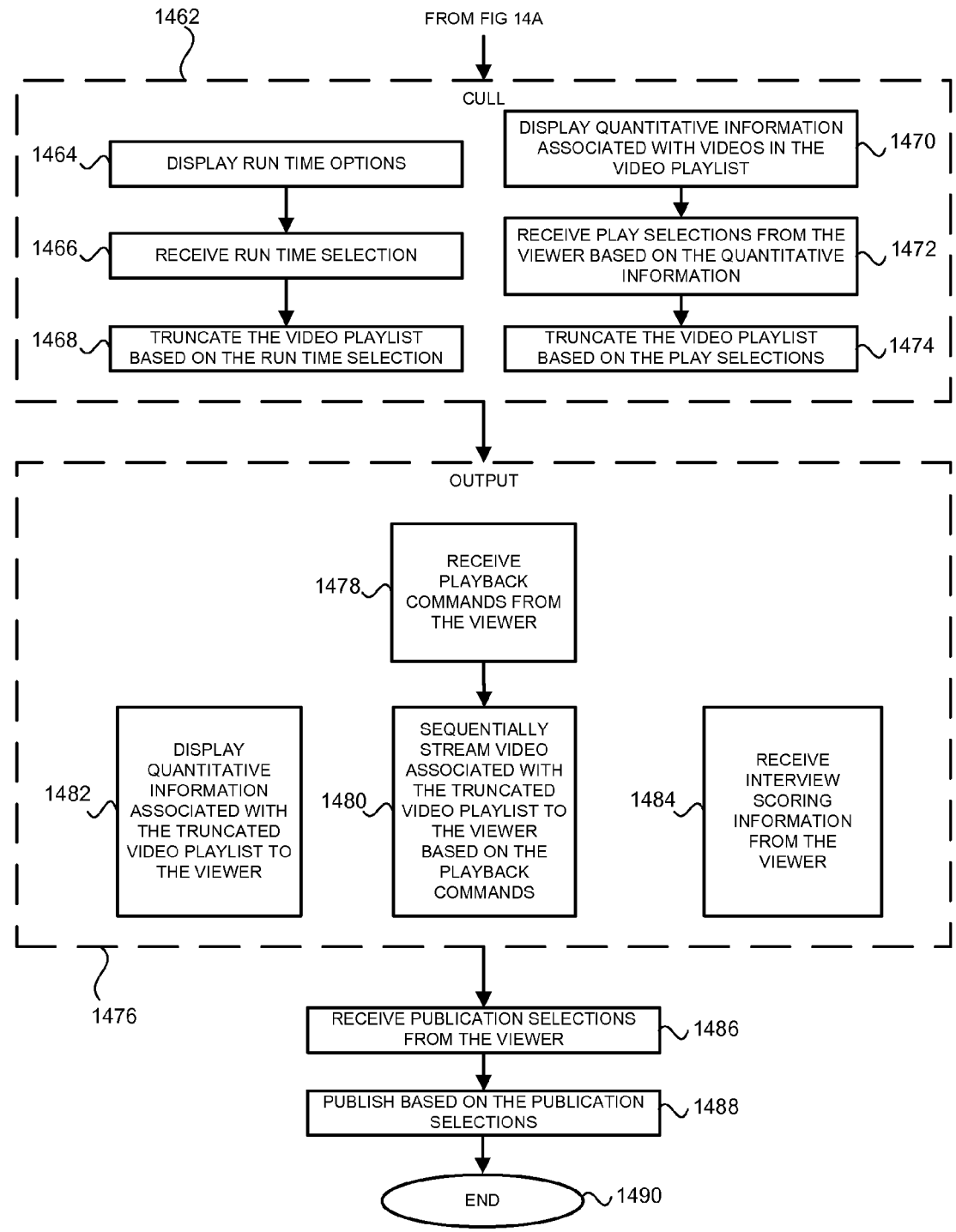

FIGS. 14A and 14B are a flow diagram of a story retrieval process, according to an embodiment of the invention. FIGS. 14A and 14B are from the perspective of a process embodied in a KM system. The process illustrated in FIG. 14B is a continuation of the process illustrated in FIG. 14A. A user of the video story retrieval process may also be referred to herein as a viewer.

As illustrated in FIGS. 14A and 14B, the process may begin in step 1400 and then authorize a user in step 1405. Step 1405 may include, for instance, receiving a login ID and password from a user, and comparing same to stored user account data. In step 1410, the process receives a story retrieval command from a user. The process receives a search command from a user in step 1415 and determines a type of search being requested in conditional step 1420.

The illustrated KM system process may utilize GUI 905 in executing steps 1405 and 1415.

Where the type of search being requested is a template search (e.g., one based on a predetermined association between story topics and questions), the process advances to step 1425 to display a story topic menu. In step 1430, the process receives a story topic selection from a user. The process then displays a question menu to a user in step 1435 based on the story topic selection. In step 1440, the process receives at least one question selection from a user and then identifies at least one video in an archive based upon the question selection in step 1445.

The illustrated KM system process may utilize GUI 905 in executing step 1425 and may further use GUI 1005 to execute steps 1435 and 1440. The KM system may use metadata identified in step 710 to execute step 1445.

Where the result of conditional step 1420 indicates a keyword search, the process receives at least one keyword in step 1450. The KM system may use GUI 905 to execute step 1450. Then, in step 1455, the process identifies at least one video in an archive based on the at least one keyword. The KM system may execute step 1455, for instance, by comparing the received at least one keyword to the first, second, third and/or fifth group of metadata identified in the process described above with reference to FIG. 7.

Upon the conclusion of either step 1445 or step 1455, the process advances to condition step 1457 to determine whether a user of the story retrieval process wishes to record a response or play a video playlist. Where it is determined in conditional step 1457 that the user wishes to record a response, the process advances to step 1459. Otherwise, the process prepares a video playlist in step 1460 that is based on the at least one video. Optionally, step 1460 could include ranking or otherwise ordering each of the videos in the playlist, for example by relevance, chronology, or other criteria.

The video playlist may be reduced in cull step 1462. In one respect, culling step 1462 may include displaying run time options to a viewer in step 1464, receiving run time selections in step 1466, and truncating the video playlist based on the run time selection in step 1468 to produce a truncated video playlist. In another respect, culling step 1462 may include displaying quantitative information associated with videos in the video playlist to the viewer in step 1470, receiving play selections from the viewer based on the quantitative information in step 1472, and truncating the video playlist in step 1474 based on the play selections to produce the truncated video playlist. Thus, in embodiments of the invention, the culling step 1462 may be based on run time selections and/or quantitative information.

Videos associated with the truncated video playlist may be presented to a viewer in output step 1476. More specifically, the KM system may receive playback commands from the viewer in step 1478 and sequentially stream video content to the viewer based on the truncated video playlist and the playback commands in step 1480. Preferably, the process may execute step 1480 using fade-to-white transitions between videos in the presented video stream.

Output step 1476 may also include displaying quantitative information in step 1482 that is associated with the truncated video playlist. Display step 1482 may display, for instance, quantitative information that has been collected from an original storyteller and/or from vantage point contributors. The format of such quantitative information display may be or include, for instance cross-tab charts, frequency charts, bar graphs, and/or pie charts. The information display portion 1230 of GUI 1205 is the type of output that could result from execution of step 1482.

Output step 1476 may also include receiving interview scoring information from the viewer in step 1484. Such scoring information may be an opinion ranking or other type of qualitative information, and may be received for each video in the video stream that is presented to the viewer. The scoring portion 1240 of GUI 1235 is an exemplary mechanism for executing step 1484.

The processes described above with reference to output step 1476 may be performed in parallel or on an interrupt basis. Steps 1482 and 1484 are optional.

At the conclusion of output step 1476, the process may receive publication selections in step 1486 and publish video associated with the truncated video playlist in step 1488 based on the publication selections. As described above, publication could include posting a video story on a website (e.g., You Tube, My Space, or other personal blog), sending the video story to one or more email addressees, and/or saving the video to a local or remote data store. The process terminates in step 1490.

Variations to the process illustrated in FIG. 14 are possible. For instance, steps 1410, 1415, and/or 1420 may be combined or omitted, according to application needs. In an alternative embodiment, the template and keyword-type searches could be combined; for instance a keyword search could be used to narrow results from a template search.

Response Process

Figure 15:
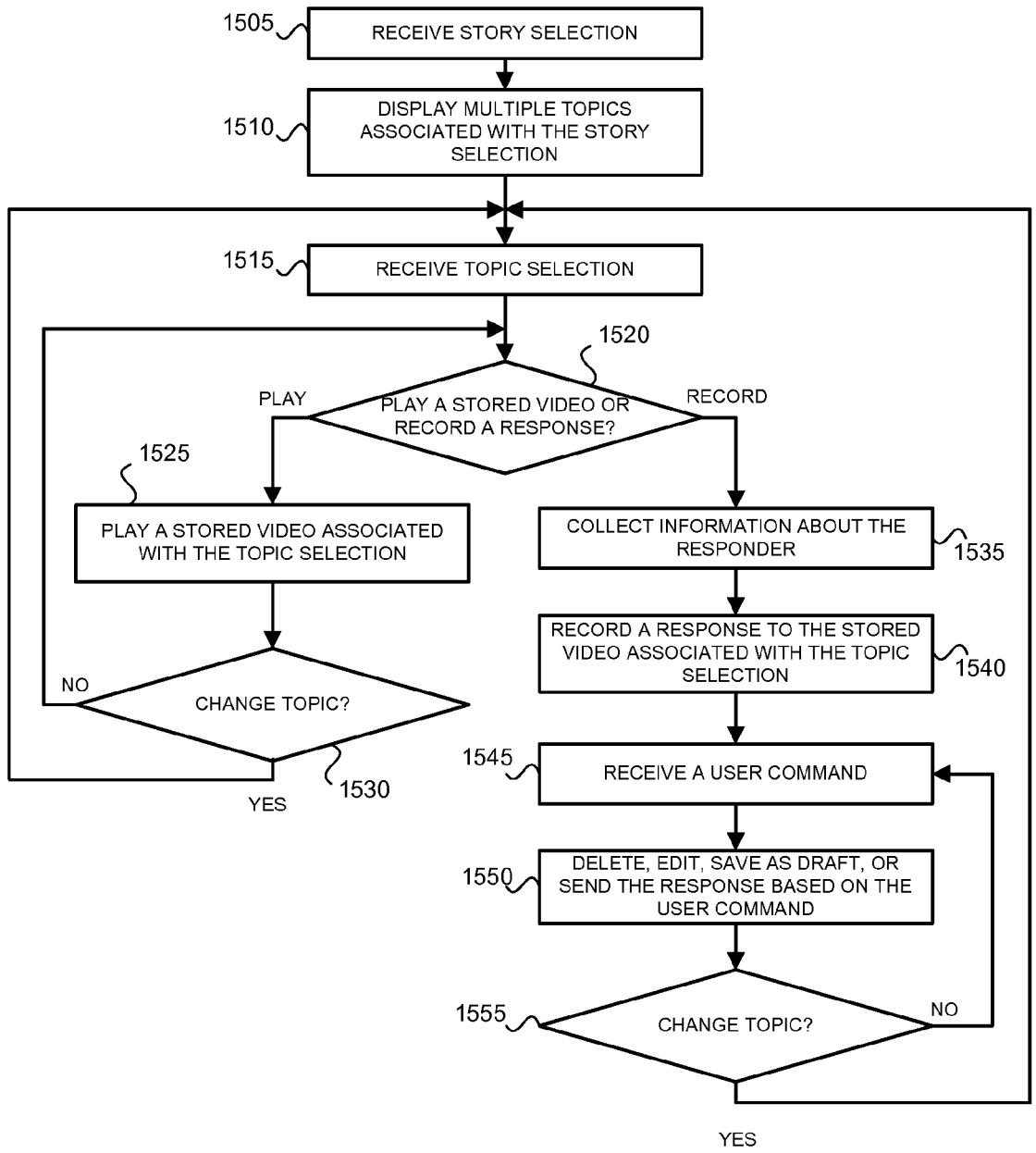
FIG. 15 is a flow diagram of a story response process, according to an embodiment of the invention.

FIG. 15 is a flow diagram of a story response process, according to an embodiment of the invention. The process illustrated in FIG. 15 could be used in response to an invitation, for instance as a result of steps 160 or 630. Alternatively, the story response process in FIG. 15 could be prompted by discovery or receipt of a response link, for example the response link published in step 650. Moreover, the story response process illustrated in FIG. 15 could be used in the execution of step 1459, e.g. subsequent to a story search/retrieval process. The process illustrated in FIG. 15 may also produce the recorded response that is received in step 652.

FIG. 15 is described from the perspective of a knowledge management system. The process illustrated in FIG. 15 assumes a story-topic-question hierarchy, where multiple topics may be associated with each story, and where at least one question is associated with each topic. In an embodiment of the invention, each topic may be associated with a single originator question and a single respondent question. The originator question and the respondent questions may be the same or different than each other.

As shown in FIG. 15, the response process may begin by receiving a story selection in step 1505. The process displays multiple topics associated with the topic selection in step 1510, and receives a topic selection in step 1515. In conditional step 1520, the process determines whether to play a stored video or record a response.

Where the process determines that a user wishes to play a video (e.g., via receipt of a play command), the process plays a video associated with the topic selection in step 1525. The process may change topics in conditional step 1530: the process can stay with the current topic (for instance to replay the stored video or record a response) in conditional step 1520; otherwise, the process can receive another topic selection in step 1515.

Where the process determines that a user wishes to record a response (e.g., via receipt of a record command), the process advances to step 1535 to collect information about the responder. Step 1535 could include, for instance, collecting information from a preexisting user profile, reading, decoding, and/or storing a user's IP address, and/or prompting the user to input predetermined biographical information. In step 1540, the process records a response to the stored video associated with the topic selection. In response to a user command received in step 1545, the process may delete, edit, save as draft, or send the recorded response.

In conditional step 1555, the process may change topics: the process can remain on the current topic by receiving a command in step 1545; otherwise, the process can change topics by receiving a topic selection in step 1515.

Variations to the process illustrated in FIG. 15 are possible. For instance, in an alternative embodiment, a story-topic-question hierarchy may not exist; in this case, all references to a topic in FIG. 15 could be replaced with a reference to a question.

Figure 16:
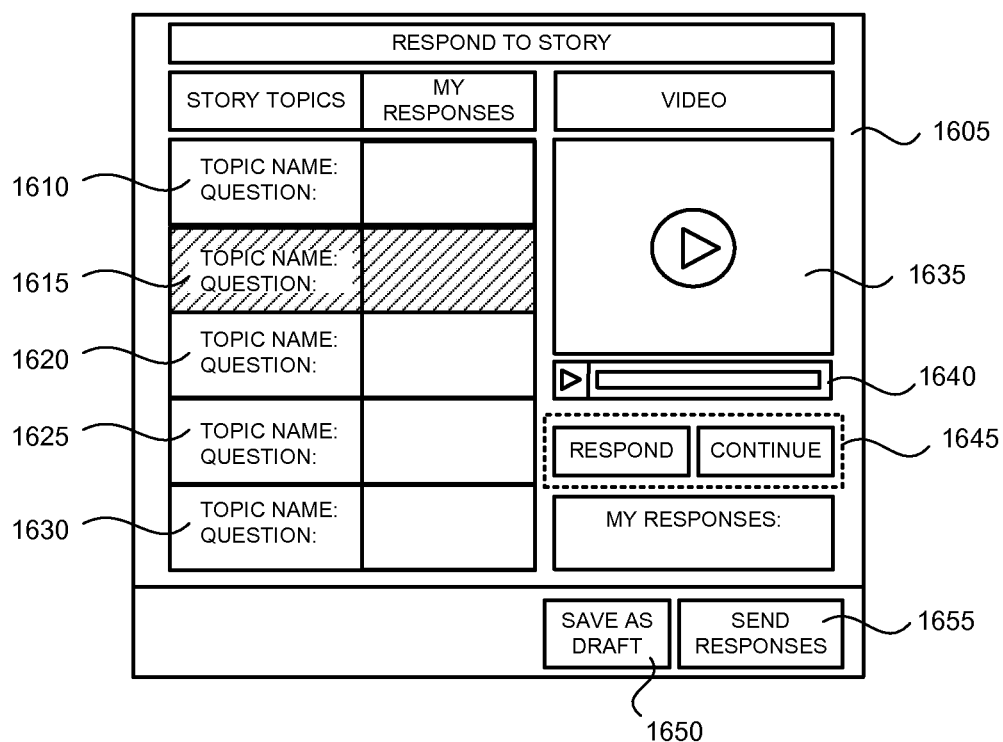
FIG. 16 is an illustration of a graphical user interface, according to an embodiment of the invention.

FIG. 16 is an illustration of a graphical user interface, according to an embodiment of the invention. As shown in FIG. 16, the GUI 1605 includes topic windows 1610, 1615, 1620, 1625, and 1630, a video display window 1635, a video control bar 1640, command buttons 1645, save button 1650, and send button 1655.

The GUI 1605 illustrated in FIG. 16 could be used to implement the response process described above with reference to FIG. 15. For instance, the topic windows 1610, 1615, 1620, 1625, and 1630 can be used to execute display step 1510. In FIG. 15, the shading of topic window 1615 indicates a selection that can be received in step 1515. A stored video may be played using the video display window 1635 and the video control bar 1640. Command buttons 1645, save button 1650, and send button 1655 may be used to input commands that are received in step 1545.

The processes described above with reference to FIGS. 6A, 6B, 6C, 7, 14A, 14B, and 15 may be implemented in hardware, software, or a combination of hardware and software.

Knowledge Management System

Figure 17:
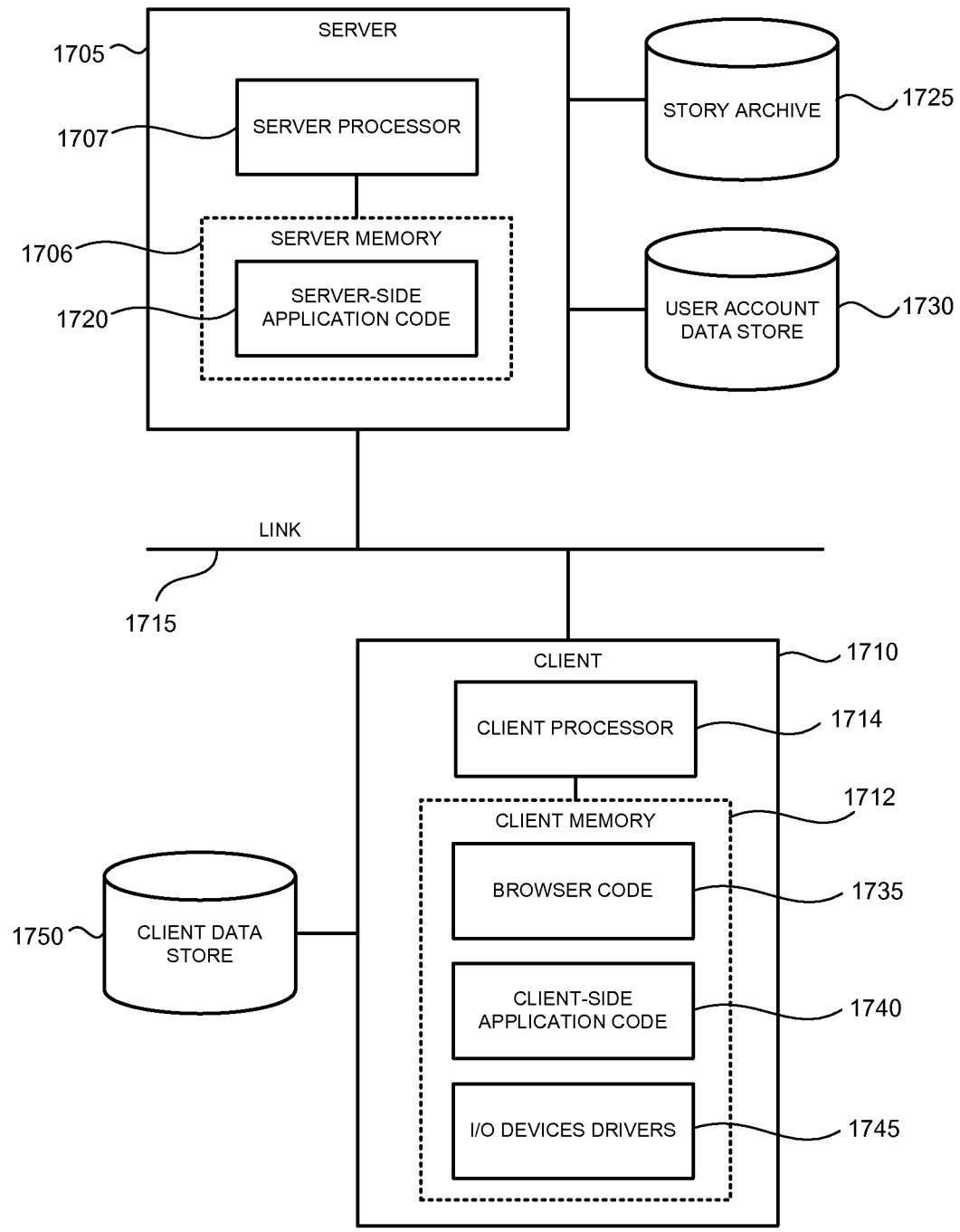
FIG. 17 is a functional architecture of a KM system, according to an embodiment of the invention.

FIG. 17 is a functional architecture of a KM system, according to an embodiment of the invention. As shown therein, a server 1705 is coupled to a client 1710 via a link 1715.

The server 1705 may be an application server and may include server-side application code 1720 that is stored in server memory 1706. The server memory 1706 could be or include, for instance, non-volatile memory device such as a flash drive, a hard disk drive, an optical disc, or other processor-readable medium. The server memory 1706 is linked to a server processor 1707 that is configured to execute instructions embodied in the server-side application code 1720. In addition, the server 1705 may include or be coupled to a story archive 1725 and/or a user account data store 1730. Thus, in one respect, the server 1705 may function as a data server.

The client 1710 may be a thick client or a thin client. The client 1710 may include, for example, browser code 1735, client-side application code 1740, and input/output (I/O) drivers 1745 that are stored in client memory 1712. The client memory 1712 could be or include, for instance, non-volatile memory device such as a flash drive, a hard disk drive, an optical disc, or other processor-readable medium. The client memory 1712 is linked to a client processor 1714 that is configured to execute instructions embodied in the client-side application code 1740. The client 1710 may also include or be coupled to a client data store 1750. The link 1715 may be or include a wired or wireless communication network. For instance, the link 1715 could be or include the Internet or other network.

Together, the server 1705 and client 1710 are configured to execute the processes described above with reference to FIGS. 6A, 6B, 6C, 7, 14A, 14B, and 15, any one or more of these processes being embodied in the server-side application code 1720 and/or the client-side application code 1740.

Variations to the KM system illustrated in FIG. 17 are possible. For example, the KM system could include more than one server, such as a separate application server and database server. Likewise, the KM system could include more than one client, as is typical in client-server architectures. The allocation of application code between the server(s) and the client(s) is subject to design choice.

In yet another embodiment, the knowledge management system could be implemented in a stand-alone computer. The stand-alone computer could include, for instance, at least one processor that is coupled to at least one memory device that can be read by the processor, and the at least one memory device including processor-executable application code. The processor-executable application code could include instructions necessary to execute any of the processes, or variants thereof, described above with reference to FIGS. 6A, 6B, 6C, 7, 14A, 14B, and/or 15.

It will be apparent to those skilled in the art that modifications and variations can be made without deviating from the spirit or scope of the invention. For example, alternative features described herein could be combined in ways not explicitly illustrated or disclosed. Thus, it is intended that the present invention cover any such modifications and variations of this invention provided they come within the scope of the appended claims and their equivalents.

What is claimed is:

1. A system comprising a computer, the computer having a processor, the computer being specially configured to perform a method, the method including:
    receiving a story topic selection from a user interface (I/F); outputting a plurality of predetermined questions to the user I/F based on the story topic selection;
    receiving a question selection from the user I/F, the question selection indicating at least one of the plurality of predetermined questions; and
    receiving a video story from the user I/F, the video story associated with the question selection,
    wherein receiving the question selection includes receiving an edited one of the plurality of predetermined questions, the edited one of the plurality of predetermined questions having been edited by a user, the video story including a narrative response by the user to the edited one of the predetermined plurality of questions.

2. A system including computer hardware, the system comprising:
    an interface to a communication network: and
    means for capturing a video-based story, the means for capturing coupled to the interface to the communication network.

3. The system of claim 2, further comprising means for retrieving the video-based story, the means for retrieving coupled to the interface to the communication network.

* * * * *